(12) United States Patent
Babando et al.

(10) Patent No.: US 8,261,545 B2
(45) Date of Patent: Sep. 11, 2012

(54) ELECTRIC POWER ACTUATOR AND CONTROL METHOD FOR SUCH AN ACTUATOR

(75) Inventors: Olivier Babando, Toulouse (FR); Nicolas Larrieu, L'Isle Jourdain (FR)

(73) Assignee: Airbus Operations (SAS), Toulouse Cedex (FR)

( * ) Notice: Subject to any disclaimer, the term of this patent is extended or adjusted under 35 U.S.C. 154(b) by 370 days.

(21) Appl. No.: 12/789,222

(22) Filed: May 27, 2010

(65) Prior Publication Data
US 2010/0308179 A1    Dec. 9, 2010

(30) Foreign Application Priority Data
Jun. 3, 2009    (FR) .................................... 09 02668

(51) Int. Cl.
*F16D 31/00*    (2006.01)
(52) U.S. Cl. .......................................... 60/445; 60/452
(58) Field of Classification Search .................. 244/194, 244/195, 99.2, 99.4, 99.5, 99.6, 99.9; 701/3, 701/10; 60/445, 452
See application file for complete search history.

(56) References Cited

U.S. PATENT DOCUMENTS

| 6,880,567 B2 * | 4/2005 | Klaver et al. ............. 137/487.5 |
| 7,191,593 B1 | 3/2007 | Ho |
| 2008/0236156 A1 | 10/2008 | Kakino et al. |

FOREIGN PATENT DOCUMENTS

| BE | 1009184 | 12/1996 |
| GB | 2171152 | 8/1986 |
| JP | 2002054604 | 2/2002 |
| JP | 2005240974 | 9/2005 |

\* cited by examiner

*Primary Examiner* — Tien Dinh
*Assistant Examiner* — Jammie S Stehle
(74) *Attorney, Agent, or Firm* — Noval Druce + Quigg LLP

(57) ABSTRACT

An electric power actuator and a method of controlling such an actuator are disclosed. The actuator (1) can include means (17, 26) for limiting the pressure difference in both chambers (9, 10) of a hydraulic jack (8) of the actuator (1) to a limit pressure which is lower than an opening pressure of a pressure relief valve (11) of the actuator (1).

8 Claims, 2 Drawing Sheets

ELECTRIC POWER ACTUATOR AND CONTROL METHOD FOR SUCH AN ACTUATOR

CROSS-REFERENCE TO RELATED APPLICATIONS

This application claims priority to French Patent Application 0902668, filed Jun. 3, 2009, the contents of which are incorporated herein by reference.

FIELD OF THE INVENTION

This invention relates to an electric power actuator and a control method for such actuator.

BACKGROUND OF THE INVENTION

An electric power actuator, which is operated by electric power, can be intended particularly, yet not only, to actuate an aircraft control surface, specially in a transport aircraft, for example an elevator, a rudder or an aileron of an aircraft.

This electric power actuator can be of the electro-hydrostatic actuator (EHA) type which usually comprises an electronic unit, an electric motor, a hydraulic pump, a pressure relief valve, a hydraulic block and a hydraulic jack. This actuator is controlled by a control current sent to the electronic unit. A local closed-loop control in the electronic unit converts this control current into a velocity set point for the electric motor. The latter drives the hydraulic pump using an electric power provided by the aircraft. The pump then locally generates hydraulic power for moving the hydraulic jack.

This invention can also be applied to an electric backup hydraulic actuator (EBHA) type, which is a hybrid actuator comprising both characteristics of a usual hydraulic servo-control and electro-hydrostatic actuator of the EHA type. In a rated situation (out of breakdown), the EBHA actuator operates as a usual servo-control. By contrast, in case of a breakdown affecting the hydraulic mode, this EBHA actuator switches to electric power supply and operates as an EHA actuator.

With such a technology, an EHA actuator is capable of generating locally more strain than the maximum level necessary for being operated. There is therefore a risk that the structure on which the EHA actuator is mounted be subjected to higher strains than the level for which it is sized. Thus, in order to protect this structure, EHA actuators are generally equipped with at least one pressure relief valve which limits strain generated by the actuator.

It should be noticed that in some configurations, the EHA actuator can be caused to operate on the pressure relief valve. In this case, the motor rotates and the hydraulic pump generates a flux which flows in the pressure relief valve instead of feeding the chambers of the jack.

In such a situation that is with a sustained flow of fluid between the pump and the pressure relief valve the actuator EHA can be very quickly damaged to the point where it can not be used anymore.

There are two different possible causes for the actuator breakdown:

a fluid overheating. The fluid which flows between the hydraulic pump and the pressure relief valve flows through a little port when it flows through the pressure relief valve, with the result that it is very quickly heated. This heat built up in the fluid is then dissipated in the whole actuator. The resulting temperature rise can quickly lead to a damaged actuator; and an overheating of the control electronics. When the pressure relief valve is opened and the fluid flows therethrough, the electric motor must provide a high torque for, on the one hand, maintaining the pressure difference in the chambers of the jack, and on the other hand, maintaining a constant speed of the actuator. In order to maintain this high torque, a current, which is also high, must flow in the electronic unit of the actuator. As the electronics of the actuator are not sized for withstanding such current level, they can quickly be damaged.

SUMMARY OF THE INVENTION

This invention relates to an electric power actuator which enables the above mentioned drawbacks to be overcome.

For that purpose, according to the invention, said actuator of the type including:
- a control unit which receives an electric control signal and which converts this electric control signal into a set point for an electric motor;
- said electric motor which drives a pump in accordance with said set point received from said control unit;
- said pump which generates hydraulic power for moving a hydraulic jack;
- said hydraulic jack which includes two chambers likely to be fed by said pump, and which generates the strain of the actuator; and
- at least one pressure relief valve for limiting the strain generated by said actuator, is remarkable in that it further comprises:
- first means for measuring the pressure difference existing between both chambers of the hydraulic jack;
- second means for calculating a correcting parameter, using said pressure difference;
- third means for calculating, from said correcting parameter and said set point, an auxiliary set point which enables, when it is applied to the electric motor, to limit the pressure difference between both chambers of the hydraulic jack to a limit pressure which is lower than an opening pressure of the pressure relief valve; and
- fourth means for applying to said electric motor said auxiliary set point, instead of said set point.

Thus, with the invention, in order to protect the electric power actuator from any overheat damage, means are provided for calculating an auxiliary set point which is provided to the electric motor for limiting the action thereof on the hydraulic pump such that the hydraulic power generated by the latter remains equal to or lower than a limit pressure. Since this limit pressure is, by definition, lower than the opening pressure of the pressure relief valve, this invention can avoid, during actuator operation, opening of said pressure relief valve, and, accordingly, it can avoid an overheat of the actuator likely to damage the same.

In a preferred embodiment, said third means comprise elements for calculating said correcting parameter Pc using the following expressions:

$$\begin{cases} Pc = 1 - \lambda \\ \lambda = (|\Delta P| - \Delta P1)/(\Delta P2 - \Delta P1) \\ \lambda \in [0, 1] \end{cases}$$

wherein:
$\Delta P$ represents said measured pressure difference; and
$\Delta P1$ and $\Delta P2$ are two predetermined values which depend on said limit pressure.

It should be noticed that said limit pressure (which is lower than the opening pressure of the pressure relief valve in order to avoid an overheating of the actuator) is, in addition, advantageously, higher than a maximum operating pressure enabling the actuator to generate the maximum strain which it should be able to produce while in operating use, for example for controlling an aircraft control surface. Such maximum operating pressure should of course be lower than said opening pressure of the pressure relief valve. Thus, with these characteristics (a limit pressure which is higher than the maximum operating pressure and lower than the opening pressure), the actuator is in a position to achieve the maximum required strain for the considered application, while being effectively protected from an overheat of the above mentioned type.

In one particular embodiment, said actuator comprises:
fifth means for determining whether the received electric control signal results in generating an increasing pressure difference or a decreasing pressure difference within the hydraulic jack; and
sixth means for inhibiting application, where needed, of said auxiliary set point to said electric motor (and therefore applying said set point), when said received electric control signal results in generating a decreasing pressure difference in absolute value, that is a pressure difference which tends to decrease.

Thus, the application of the auxiliary set point, that is the limitation of the strain generated by the actuator, is inhibited when the applied set point aims at reducing the pressure difference between both chambers of the hydraulic jack (even if such pressure difference is higher than said opening pressure of the pressure relief valve). In this case, the actuator is provided with full authority to reduce this pressure difference, by disabling the above mentioned protection (that is limitation) function.

Further, advantageously, said actuator comprises:
filtering means for filtering said pressure difference measured by said first means, before it is transmitted to said second means; and/or
checking means for checking, before operating the actuator, consistency of a pressure difference value, measured by said first means.

This invention also relates to a control system of a control surface, particularly a control surface (aileron, rudder, elevator) of an aircraft, particularly in a transport aircraft. Such control system of the type including:
a control means for generating an electric control signal; and
an actuator which receives said electric control signal and which generates a strain on the control surface according to said electric control signal,
is remarkable in that said actuator is of the above mentioned type in accordance with the invention.

This invention also relates to an aircraft, particularly a transport aircraft, which comprises an actuator and/or a control surface control system, as mentioned above.

Besides, this invention also relates to a control method of an actuator of the above mentioned type. This method aims at automatically protecting the actuator from overheat while operating.

According to the invention, said method is remarkable in that, automatically and repeatedly:
the pressure difference between both chambers of the hydraulic jack is measured;
a correcting parameter is calculated using this measured pressure difference;
from said correcting parameter Pc and said set point, an auxiliary set point is calculated for, when it is applied to the electric motor, limiting the pressure difference between both chambers of the hydraulic jack to a limit pressure which is lower than an opening pressure of the pressure relief valve; and
said auxiliary set point is applied to said electric motor instead of said set point.

Thus, with the invention, the pressure difference in chambers of the jack is limited to a value (a limit value) which is lower than the opening pressure of the pressure relief valve. Accordingly, speed of the jack is decreased when the pressure difference becomes high, by limiting the command (auxiliary set point) sent to the electric motor.

Advantageously, the following expressions are used for calculating such correcting parameter Pc:

$$\begin{cases} Pc = 1 - \lambda \\ \lambda = (|\Delta P| - \Delta P1)/(\Delta P2 - \Delta P1) \\ \lambda \in [0, 1] \end{cases}$$

wherein:
$\Delta P$ represents said measured pressure difference; and
$\Delta P1$ and $\Delta P2$ are two predetermined values which depend on said limit pressure.

Further, advantageously, for calculating said auxiliary set point, said set point is multiplied by said correcting parameter.

Besides, advantageously, automatically and repeatedly:
it is determined whether the received electric control signal generates an increasing pressure difference or a decreasing pressure difference within the hydraulic jack; and
where needed, application of said auxiliary set point is inhibited when said received electric control signal results in generating a decreasing pressure difference in absolute value.

BRIEF DESCRIPTION OF THE DRAWINGS

The figures of the appended drawing will help better understand how the invention can be carried out. In these figures, identical references refer to similar elements.

DETAILED DESCRIPTION

Figure 1:
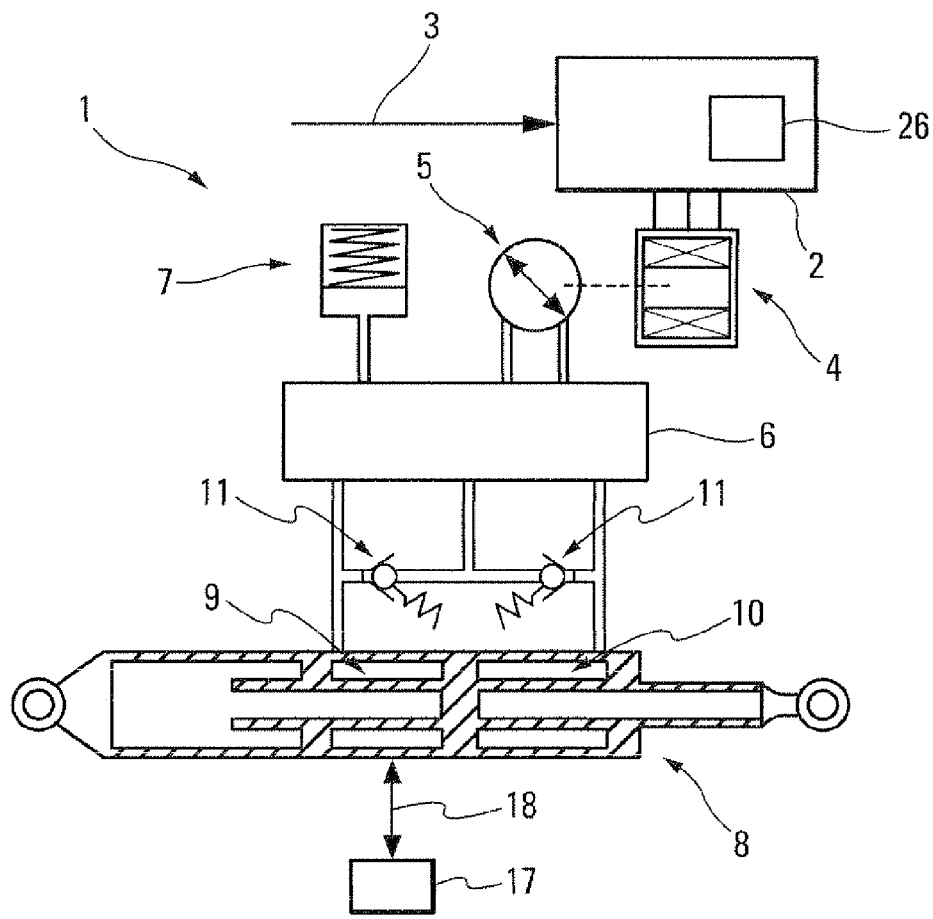
FIG. 1 schematically illustrates an actuator in accordance with the invention.

The actuator 1 in accordance with the invention and schematically depicted in FIG. 1 is an electric power actuator, i.e. an actuator which is operated with electric power. This actuator 1 is intended to actuate (that is move) a mechanical member, particularly a control surface of an aircraft, specially a transport aircraft. According to the invention, this actuator 1 is improved so as to be protected from any overheat damage.

Said actuator 1 is of the type comprising:
an electronic control unit 2 which receives an electric control signal (detailed below) through a link 3 and which converts this electric control signal into a (speed) set point 10 for an electric motor 4;

said electric motor 4 which drives an hydraulic pump 5, in accordance with the speed set point IO received from said control unit 2;

said pump 5 which is associated with a hydraulic block 6 comprising, in addition, a storage cell 7 and which generates hydraulic power in accordance with driving carried out by said electric motor 4. Such hydraulic power enables a hydraulic jack 8 to be moved; and said hydraulic jack 8 which comprises two chambers 9 and 10 likely to be fed by said pump 5. Said hydraulic jack 8 is moved, usually, depending on the pressure difference between both chambers 9 and 10. The movement of said hydraulic jack 8 generates the strain produced by the actuator 1 on the mechanical member it actuates, particularly an aircraft control surface.

Said actuator 1 additionally includes one or more usual pressure relief valves 11 for limiting the strain it generates. Each pressure relief valve 11 is associated with an opening pressure which represents a pressure difference between both chambers 9 and 10, for which the pressure relief valve 11 automatically opens such as to provide its protection function. Indeed, usually, a pressure relief valve is provided such that it automatically opens under a predetermined fluid pressure, and then discharges a fluid flow rate so as to limit the pressure in chambers and closes when normal operating conditions are restored.

Said actuator 1 which is an electric power actuator may correspond to an electro-hydrostatic actuator (EHA) type. It may also be an electrical backup hydraulic actuator (EBHA) type, when it operates in the electric mode. This EBHA actuator is a hybrid actuator having both characteristics of a usual hydraulic servo-control and an EHA type electro-hydrostatic actuator. In a rated situation (out of breakdown), the EBHA actuator operates as a usual servo-control. On the contrary, in case of a breakdown affecting the hydraulic mode, this EBHA actuator switches to electric mode and operates as an EHA actuator.

Figure 2:
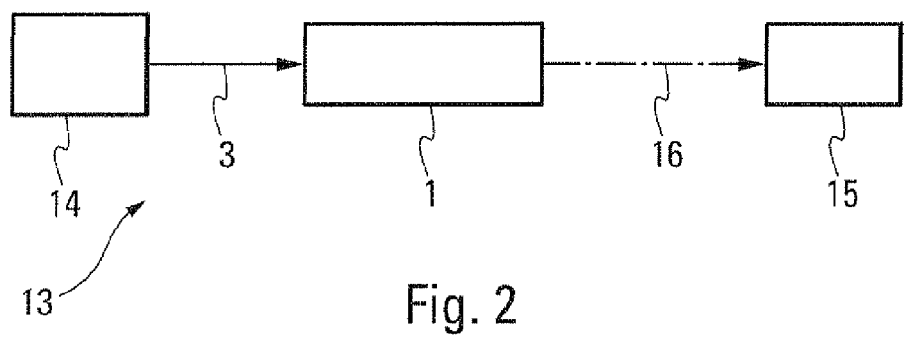
FIG. 2 is the block diagram of a control system of a control surface in accordance with the invention.

Said actuator 1 can be used more particularly, but not only, for actuating an aircraft control surface, in particular of a transport aircraft, for example an elevator, a rudder or an aileron of an aircraft. In such an application, said actuator 1 can be part of a system 13 for controlling the control surface which includes, in addition, as shown in FIG. 2:

a control means 14 which enables to generate an electric control signal which is transmitted through the link 3 to the control unit 2 of the actuator 1. This control means 14 can include usual manual means, for example a control stick or member, such that an operator, in particular the aircraft pilot, can generate a control signal in order to move the control surface 15. This control means 14 can also include usual automatic means for generating, automatically, in particular on the basis of measured values, an electric control signal; and said control surface 15, for example an aileron, an elevator or a rudder, which is moved by said actuator 1 (or by a plurality of actuators 1), as illustrated by a link 16 in chain dotted lines in FIG. 2.

Figure 4:
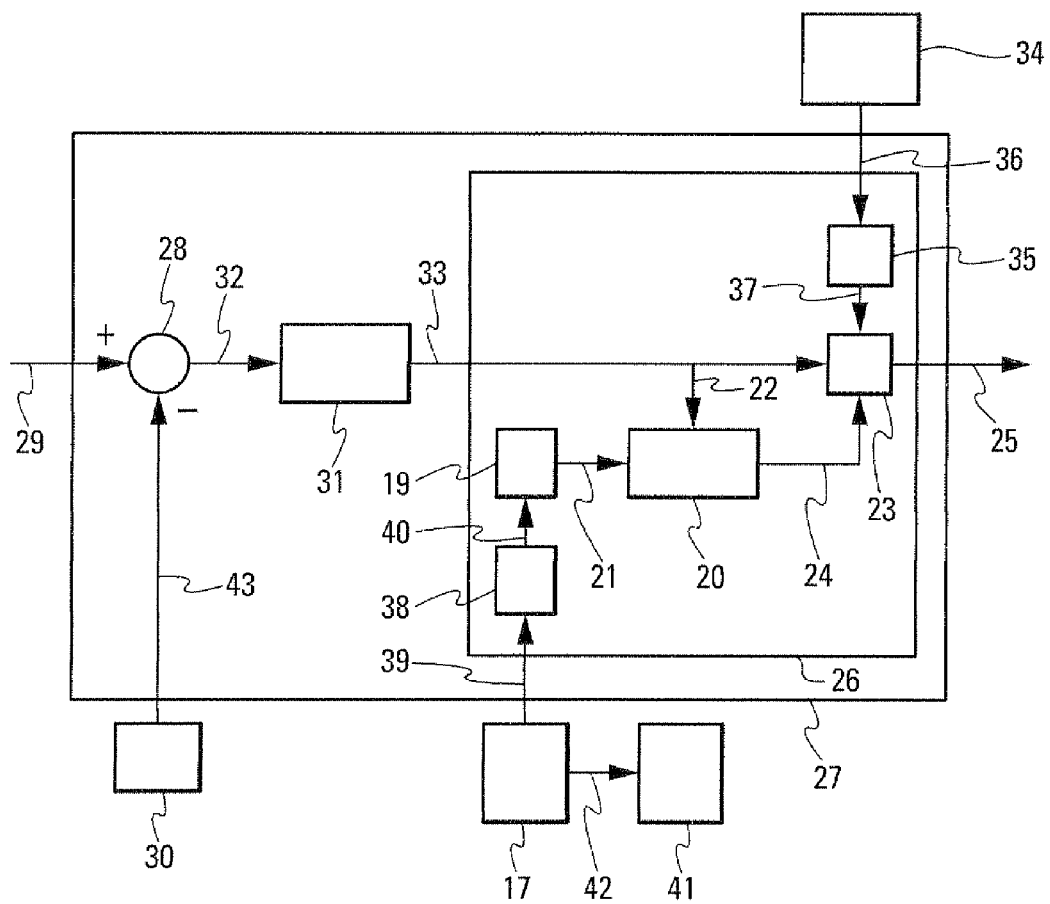
FIG. 4 schematically shows means of an actuator in accordance with the invention.

According to the invention, in order to protect such actuator 1 from overheat damages, the latter further comprises, as depicted in FIG. 4:

means 17 for automatically measuring, in a usual way, the current pressure difference $\Delta P$ between both chambers 9 and 10 of the hydraulic jack 8, as schematically shown by a link 18 in FIG. 1;

means 19 which are connected to said means 17 and which are intended to automatically calculate a correcting parameter Pc detailed below, using the current pressure difference $\Delta P$ measured by said means 17;

means 20 which are connected through a link 21 to said means 19 for receiving the correcting parameter Pc and which further receive said set point 10 through a link 22. These means 20 are formed such as to automatically calculate, on the basis of said correcting parameter Pc and said set point IO, an auxiliary set point Iaux which enables, when it is applied to the electric motor 4, to limit the pressure difference between both chambers 9 and 10 of the hydraulic jack 8, to a limit pressure P1 which is lower than an opening pressure PO of the pressure relief valve(s) 11. More precisely, said means 20 multiply values Pc and I0 in order to obtain said auxiliary set point Iaux (Iaux=Pc.I0); and means 23 which are connected through a link 24 to said means 20 and which are formed such as to automatically apply to said electric motor 4, through a link 25, said auxiliary set point Iaux, instead of said set point 10.

Therefore, in order to be protected from any damage due to too long and/or too numerous openings of the pressure relief valve(s) 11, the electric power actuator 1 is provided with means 17, 19, 20 and 23 intended to calculate an auxiliary set point Iaux which will be supplied to the electric motor 4 for limiting the action thereof on the hydraulic pump 5 such that the hydraulic power generated by the latter remains equal to or lower than a limit pressure P1. Since this limit pressure P1 is, by definition, lower than the opening pressure PO of the pressure relief valve 11, the above mentioned means in accordance with this invention enable to avoid, while the actuator 1 is operating, opening of the pressure relief valve(s) 11, and therefore they can in particular prevent an overheat of the actuator 1, likely to damage the same from occurring.

In a preferred embodiment, said means 19 include elements for calculating said correcting parameter Pc using the following expressions:

$$\begin{cases} Pc = 1 - \lambda \\ \lambda = (|\Delta P| - \Delta P1)/(\Delta P2 - \Delta P1) \\ \lambda \in [0, 1] \end{cases}$$

wherein:

$\Delta P$ represents said measured pressure difference; and $\Delta P1$ and $\Delta P2$ are two predetermined values which depend on said limit pressure P1.

Figure 3:
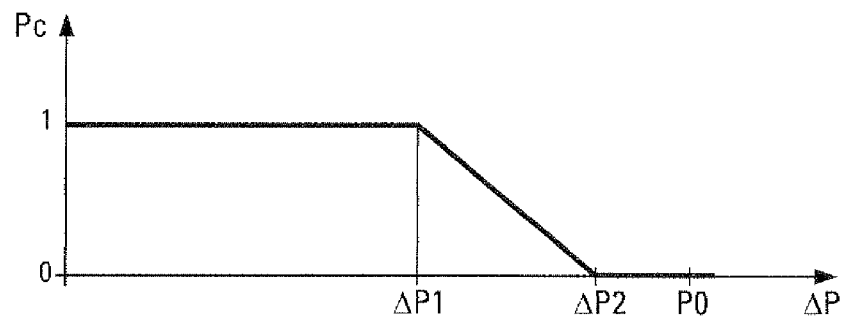
FIG. 3 is a plot for giving a good explanation of the characteristics of this invention.

FIG. 3 is a diagram for showing the evolution of the correcting parameter Pc, between 0 and 1, as a function of the pressure difference $\Delta P$ measured by means 17. The protection function in accordance with the invention has no effect on the set point (Pc=1) as long as the pressure difference $\Delta P$ does not reach the value $\Delta P1$.

Said limit pressure P1 (which is a pressure difference value between both chambers) is lower than said opening pressure P0 of the pressure relief valve 11 (which is also a pressure difference value between the chambers), by a predetermined value (for example a few bars) or by a predetermined percentage (for example 90%). In addition, $\Delta P2$ can be equal to said limit pressure P1 and $\Delta P1$ can represent a predetermined percentage (for example 70%) of such limit pressure P1.

It should be noticed that said limit pressure P1 (which is lower than the opening pressure P0 of the pressure relief valve 11 in order to avoid any overheat of the actuator 1) is, in addition, higher than a maximum operating pressure for the actuator 1 to generate the maximum strain which it should be able to produce while in operating use, for example for controlling the control surface 15. This maximum operating pressure should of course be lower than said opening pressure P1 of pressure relief valve. Thus, with these characteristics (a limit pressure P1 which is higher than the maximum operating pressure and lower than the opening pressure P0), the actuator 1 is in a position to achieve the maximum strain which can be required therefrom for the considered application, while being effectively protected from an overheat of the above mentioned type.

In the example depicted in FIG. 4, said means 19, 20 and 23 are integrated into a unit 26 which can be part of a usual closed loop control set 27 intended to perform a closed loop control of the actuator 1. Such set 27 includes:
- a calculating means 28 which calculates the difference between the controlled command for generating a movement of the actuator 1 (received from link 29) and an actual movement value measured by the usual means 30 and received through a link 43; and
- processing means 31 which are connected through a link 32 to said calculating means 28 and which perform usual processings, in particular filtering. These means 31 transmit through a link 33 a value representing said set point 10.

In one particular embodiment, said actuator 1 further comprises:
- means 34 for determining whether the electric control signal received from the link 3 results in (if it is applied as such to the actuator 1) generating an increasing pressure difference (that is a pressure difference which increases between the chambers 9 and 10) or a decreasing pressure difference (that is a pressure difference which decreases between chambers 9 and 10) in the hydraulic jack 8; and
- means 35 which are connected through a link 36 to said means 36 and which are formed such as to inhibit the application, where needed, of said auxiliary set point Iaux to said electric motor 4, when said received electric control signal results in generating a decreasing pressure difference in absolute value, that is a pressure difference which tends to decrease. For that purpose, said means 35 can act through a link 37 on said means 23 such that the latter transmit through the link 25, the command received from the link 33 (that is said set point JO) in case of inhibition.

Besides, said actuator 1 also includes:
- filtering means 38 for filtering the pressure difference ΔP measured by said means 17 and received through a link 39, before it is transmitted to said means 19 through a link 40; and
- checking means 41 which are connected through a link 42 to said means 17 and which are formed such as to check, before the actuator 1 operates, the consistency of a pressure difference value, measured by said first means 17.

For that purpose, said means 41 compare, for example, the value measured before operation (which should therefore be null) with a particular low pressure value, for example a few tens of bars, and the measured value is considered as consistent if it is lower than such threshold value.

It should be noticed that the correction term Pc is limited to 1 in order to implement the fundamental principle of this invention of decreasing the speed of the jack 8 of the actuator 1 by limiting the command being sent. As to the limitation to zero, it is a matter of trade-off between safety and effectiveness of the function. Indeed, the correcting parameter could be negative. However, this solution would not be safe in case of failure in the measurement of pressure difference, due for example to sensor or connection breakdown. In such a situation, if the sensor provides an erroneous measure which is higher than the maximum pressure difference, the correcting parameter will be negative and the command (the auxiliary set point faux) sent to the actuator 1 will be opposite to the command (the set point IO) calculated by the control unit 2.

The invention claimed is:

1. An electric power actuator, said actuator (1) comprising:
   - a control unit (2) which receives an electric control signal and which converts this electric control signal into a set point for an electric motor (4);
   - said electric motor (4) which drives a pump (5) in accordance with said set point received from said control unit (2);
   - said pump (5) which generates hydraulic power for moving a hydraulic jack (8);
   - said hydraulic jack (8) which includes two chambers (9, 10) likely to be fed by said pump (5), and which generates the strain of the actuator (1);
   - at least one pressure relief valve (11) for limiting the load generated by said actuator (1);
   - first means (17) for measuring the pressure difference (ΔP) existing between both chambers (9, 10) of the hydraulic jack (8);
   - second means (19) for calculating a correcting parameter (Pc), using said pressure difference (ΔP), said second means (19) including elements for calculating said correcting parameter (Pc) using the following expressions:

$$\begin{cases} Pc = 1 - \lambda \\ \lambda = (|\Delta P| - \Delta P1)/(\Delta P2 - \Delta P1) \\ \lambda \in [0, 1] \end{cases}$$

wherein:
   ΔP represents said measured pressure difference; and
   ΔP1 and ΔP2 are two predetermined values which depend on said limit pressure;
   - third means (20) for calculating, from said correcting parameter (Pc) and said set point, an auxiliary set point which enables, when it is applied to the electric motor (4), to limit the pressure difference between both chambers (9, 10) of the hydraulic jack (8) to a limit pressure which is lower than an opening pressure of the pressure relief valve (11); and
   - fourth means (23) for applying to said electric motor (4) said auxiliary set point, instead of said set point.

2. The actuator according to claim 1, comprising:
   - fifth means (34) for determining whether the received electric control signal results in generating an increasing pressure difference or a decreasing pressure difference within the hydraulic jack (8); and
   - sixth means (35) for inhibiting application, where needed, of said auxiliary set point to said electric motor (4), when said received electric control signal results in generating a decreasing pressure difference in absolute value.

3. The actuator according to claim 1, comprising filtering means (38) for filtering said pressure difference measured by said first means (17), before being transmitted to said second means (19).

4. The actuator according to claim 1, comprising checking means (41) for checking, before the actuator (I) operates, the consistency of a pressure difference value, measured by said first means (17).

5. A control system for a control surface, in particular a control surface for an aircraft, said system (13 comprising:
   - a control means (14) for generating an electric control signal; and
   - an actuator (1) which receives said electric control signal and which generates a strain on said control surface (15) according to said received electric control signal,
wherein said actuator (1) is such as the one specified under claim 1.

6. A method for controlling an actuator (1) comprising:
- a control unit (2) which receives an electric control signal and which converts this electric control signal into a set point for an electric motor (4);
- said electric motor (4) which drives a pump (5) in accordance with said set point received from said control unit (2);
- said pump (5) which generates hydraulic power for moving a hydraulic jack (8);
- said hydraulic jack (8) which includes two chambers (9, 10) likely to be fed by said pump (5), and which generates the strain of the actuator (1); and
- at least one pressure relief valve (11) for limiting the strain generated by said actuator (1);

according to which method, automatically and repeatedly:
- the pressure difference ($\Delta P$) between both chambers (9, 10) of the hydraulic jack (8) is measured;
- a correcting parameter Pc is calculated using the following expressions:

$$\begin{cases} Pc = 1 - \lambda \\ \lambda = (|\Delta P| - \Delta P1)/(\Delta P2 - \Delta P1) \\ \lambda \in [0, 1] \end{cases}$$

wherein:
- $\Delta P$ represents said measured pressure difference; and
- $\Delta P1$ and $\Delta P2$ are two predetermined values which depend on said limit pressure;
- from said correcting parameter Pc and said set point, an auxiliary set point is calculated for, when it is applied to the electric motor (4), limiting the pressure difference between both chambers (9, 10) of the hydraulic jack (8) to a limit pressure which is lower than an opening pressure of the pressure relief valve (11); and
- said auxiliary set point is applied to said electric motor (4) instead of said set point.

7. The method according to claim 6, wherein, in order to calculate said auxiliary set point, said set point is multiplied by said correcting parameter.

8. The method according to claim 6, wherein, automatically and repeatedly,
- it is determined whether the received electric control signal results in generating an increasing pressure difference or a decreasing pressure difference within the hydraulic jack (8); and
- where needed, application of said auxiliary set point is inhibited when said received electric control signal results in generating a decreasing pressure difference in absolute value.

* * * * *